United States Patent
Kozycki

[11] Patent Number: 6,123,614
[45] Date of Patent: Sep. 26, 2000

[54] METHOD AND APPARATUS FOR REMOVING PIN BONES

[75] Inventor: Lawrence V. Kozycki, Fairbanks, Ak.

[73] Assignee: University of Alaska Fairbanks, Fairbanks, Ak.

[21] Appl. No.: 09/253,262

[22] Filed: Feb. 19, 1999

Related U.S. Application Data

[60] Provisional application No. 60/075,316, Feb. 20, 1998.

[51] Int. Cl.[7] .................................................. A22C 25/16
[52] U.S. Cl. ............................................ 452/135; 452/83
[58] Field of Search .................................... 452/135, 133, 452/137, 138, 139, 83, 85

[56] References Cited

U.S. PATENT DOCUMENTS

| | | |
|---|---|---|
| 3,902,222 | 9/1975 | Hartmann . |
| 4,037,294 | 7/1977 | Cowie et al. . |
| 4,236,275 | 12/1980 | Westerdahl . |
| 4,771,511 | 9/1988 | Weyand . |
| 4,945,607 | 8/1990 | Akesson et al. . |
| 5,088,958 | 2/1992 | Evers et al. ............................. 452/162 |
| 5,520,576 | 5/1996 | Wastell et al. .......................... 452/161 |
| 5,525,101 | 6/1996 | Söderlind ................................ 452/135 |
| 5,830,052 | 11/1998 | Wadsworth ............................ 452/161 |
| 5,904,616 | 5/1999 | Larsen .................................... 452/135 |
| 5,911,621 | 6/1999 | Durst et al. ............................ 452/135 |

FOREIGN PATENT DOCUMENTS

| | | |
|---|---|---|
| 26 41427 | 5/1977 | Germany . |
| 6-046743 | 2/1994 | Japan . |
| WO 9212641 | 8/1992 | WIPO . |
| WO 9718717 | 5/1997 | WIPO . |

*Primary Examiner*—Willis Little
*Attorney, Agent, or Firm*—Needle & Rosenberg, P.C.

[57] ABSTRACT

An apparatus and method for removing pin bones from a fillet of fish. The apparatus of the present invention uses a plurality of spring-tempered sheet metal disks that each has a periphery that can be either non-linear or linear. The disks are assembled to form a stack of the disks aligned so that the peripheries form at least one "pinch-point," in which the periphery of two disks contact each other, to grip a pin bone. The stack of the disks is rotated and moved over the fillet. The pill bone is disposed between two adjacent rotating disks. As the gap between the disks closes to the pinch-point, the pin bone becomes wedged and is plucked out of the fillet as the wedged pin bone is pulled by the rotating disks.

27 Claims, 6 Drawing Sheets

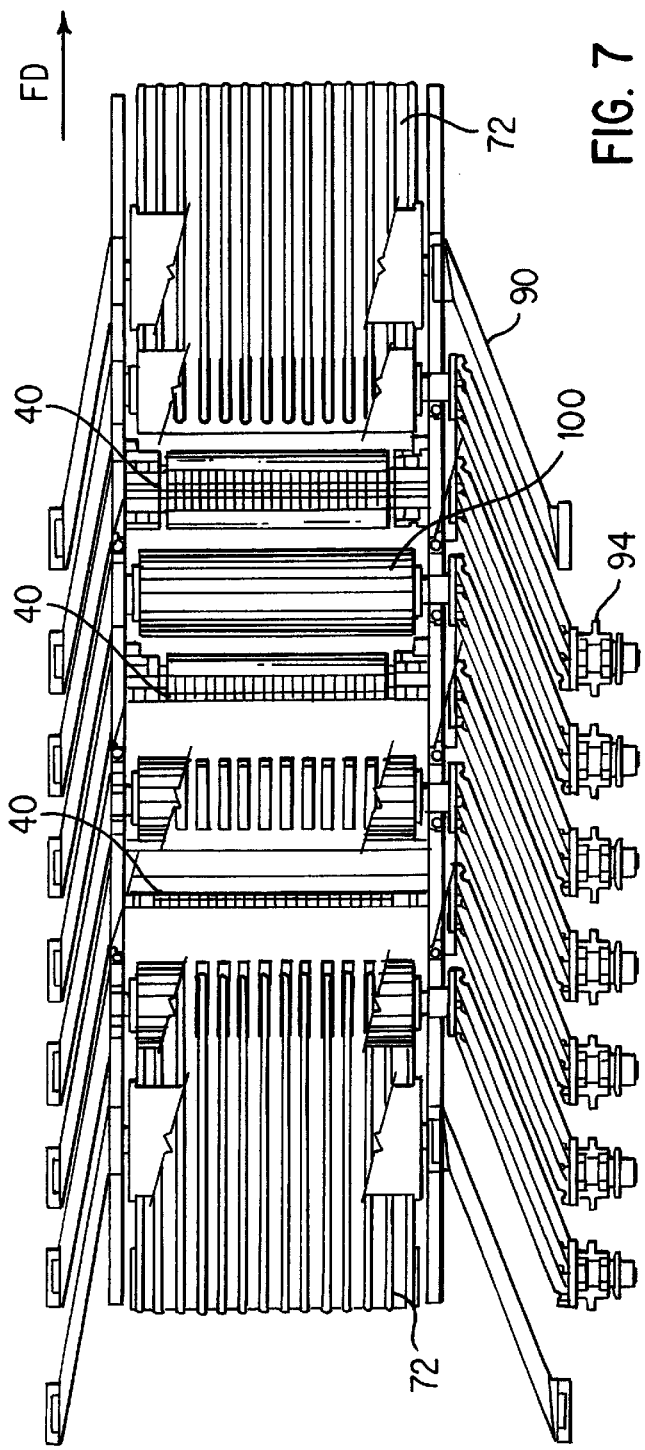
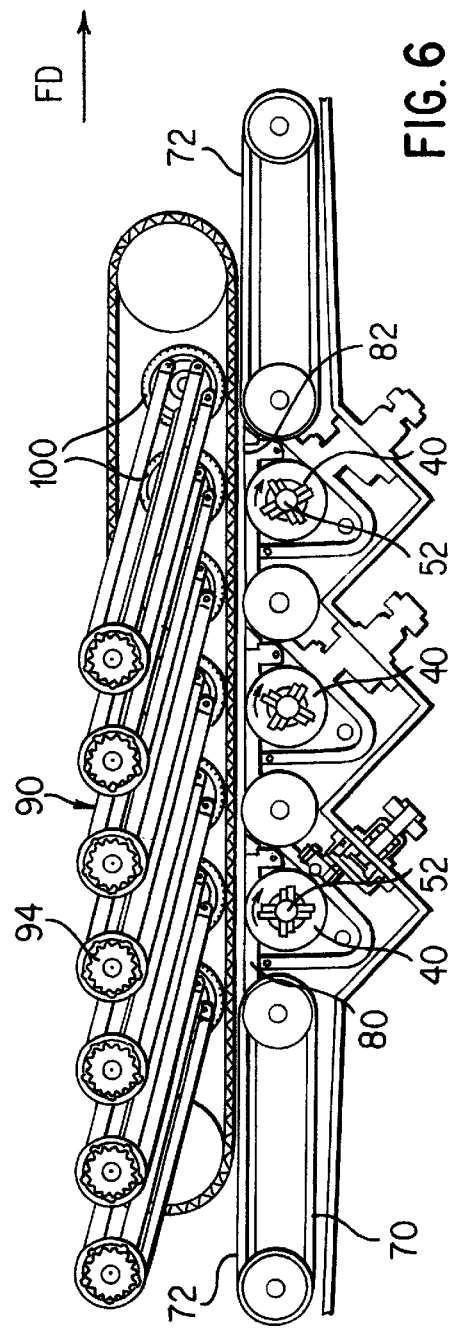

METHOD AND APPARATUS FOR REMOVING PIN BONES

This application claims priority from a provisional application Ser. No. 60/075,316, filed on Feb. 20, 1998, the content of which is incorporated herein by reference.

BACKGROUND OF THE INVENTION

1. Field of the Invention

The present invention relates to a device and method for removing bones from a fish and, more specifically, for removing pin bones from a fillet of salmon, pollack, mackerel, trout, whitefish, haddock, scrod, and the like.

2. Background Art

Fish possess a skeletal structure that has a vertebral column or back bone from which spines extend upwardly (dorsal spines) and downwardly (ventral spines). No ventral spines are located in the region of the fish's belly cavity, however. Vertebrae extend over the top of the belly cavity for a short distance on either side of the mid-line, from which rib bones depend and curve downwardly to enclose the belly. Pin bones extend horizontally from the rib bones and terminate at or near the skin. There are about forty pin bones in salmon.

The normal method of filleting fish, by hand or machine, is to cut through the fish following the line of the bones from the dorsal to ventral fins and to pass over the rib bones, which severs the connections between the pin bones and the rib bones. Thus, a line of pin bones remains in the fillet.

There are two methods commonly used to remove the remaining pin bones from the fillet: cutting out the pin bones or pulling them out. For the first option, filleting machines exist in the prior art that can produce bone-free fish fillets, but the yield is substantially lowered since the whole belly flap is cut off to ensure complete removal of the pin bones. The flesh of the belly flap can be recovered in a minced form after its passage through a bone separating device.

However, since salmon and other fish are expensive removal of the pin bones without extracting substantial quantities of meat is desired. Thus, the second option of pin bone removal is used, which is to pull the bones out of the fillet. The oldest technique is pulling out the bones using a gripping tool, such as pliers. However, this option is time-consuming and labor-intensive, which results in higher cost to the consumer and potential injuries to the workers, such as carpal tunnel syndrome.

U.S. Pat. No. 4,771,511 teaches a tool to remove simultaneously multiple pin bones, instead of individually pulling the pin bones out. The disclosed device includes a pair of opposed plates attached to forceps. The plates allow the device to remove more than one pin bone at a time. However, this technique still relies on manual labor and, thus, suffers from the disadvantages discussed above.

U.S. Pat. No. 4,945,607 discloses a pair of jaws used in another prior art technique. One of the jaws is fixedly positioned and the second jaw is pivoted relative to the first jaw by a pneumatically-operated cylinder between an opened position and a closed position. When the pin bone is positioned between the jaws in the opened position, the cylinder moves the second jaw to the closed position, which grasps the pin bone so that the pin bone may be pulled out of the fillet. This device, however, is bulky and difficult to align with the pin bones.

Still another prior art device is a rotatable cylinder having a plurality of holes for receiving fish bones. When the operator moves the rotating cylinder across the surface of a fish fillet, pin bones are caught in the holes in the cylinder. To ensure that the bones are held to the hole and pulled from the fillet, a tongue or lip moves to grip the pin bone against the edge of the hole. After the pin bone is removed and as the cylinder spins away from the fillet, the tongue separates from the edge of the hole to release the pin bone. A vacuum suction device conveys the bone away from the cylinder and into a collecting receptacle. U.S. Pat. No. 5,525,101 discloses an embodiment of this design.

This rotatable cylinder design, like other prior art systems, also has drawbacks. One problem is that when the operator moves the cylinder across the fillet, it obscures the area where the bones are picked up. Consequently, the pin bones are easily flattened so that the cylinder does not catch the bones, hindering the operator from removing all the bones and requiring the operator to repeat the process. Another potential problem is that the operator pressing the rotating cylinder against the fillet may potentially remove meat from the fillet and create a less appealing appearance. Additionally, the removed pin bones may become stuck in the cylinder holes used to remove the pin bones, which may eventually require an interruption in operation to clean the cylinder. In conjunction, throughly cleaning the device can be time-consuming and cumbersome. Cost is another drawback of the rotating cylinder design.

Therefore, a need exists in the art for a relatively inexpensive device to remove pin bones from fish. It is desired that the device can be used in an automated process, instead of having an operator who removes the bones by manually maneuvering a machine. Still another need in the art is for a device that reliably extracts the pin bones without removing a significant amount of meat from the fillet, creating an unattractive surface appearance, or otherwise damaging the fillet.

SUMMARY OF THE INVENTION

The present invention satisfies these and other needs in the art. The apparatus and method of the present invention comprise a plurality of identical, spring-tempered sheet metal disks that each has a periphery that can be either non-linear or linear. The disks are assembled on a shaft to form a stack of the disks aligned so that the peripheries form at least one "pinch-point," in which the periphery of two disks contact each other, to grip a pin bone.

The fillet preferably moves along a conveyor line. The stack is located between an in-feed table and an out-feed table, the top surfaces of which are slightly below the peak portions, or highest portions, of the disks in the stack so that the peak portions of the disks contact the lower side of the fillet. The stack rotates in the same direction as the fillet is moving at the point that the peripheries of the disks contact the fillet.

Light pressure from a floating feed roller located above the stack is applied to the upper side of the fillet when the fillet is disposed on the top of the stack, causing a portion of each of the pin bones to extend downwardly and slightly out of the lower side of the fillet. The protruding pin bones are stopped from being deflected forward by contact with the out-feed table. Each pin bone is initially disposed in one gap intermediate the periphery of two adjacent disks in the stack. As the stack rotates, the pin bone is then gripped by a portion of the respective peripheries of each of the two adjacent disks near a pinch-point. The gripped portion of the pin bone is held by one of the pinch-points of the rotating stack and is carried around with it.

The out-feed table supports the fillet and prevents it from being carried around with the portion of the stack holding the pin bone, resulting in the bone being extracted from the fillet. That is, as the pin bone is held between the two disks, the continuing relative movement between the stack of the disks and the pin bone pulls the bone out of the fillet. The bone that was extracted from the fillet is removed from between the disks before rotating to contact another portion of the lower side of the fillet. Or, as the two adjacent disks that formed a pinch-point to grip the pin bone disengage from each other, the bone may just simply fall out because of the gravity.

In one embodiment, the present invention discloses a pin bone removal apparatus having a plurality of disks, each disk having a center, a periphery circumscribing the center, a diameter, a first side, and an opposed second side, wherein the diameters of each of the disks are substantially the same dimension. The apparatus also has means for positioning the disks relative to each other so that the centers of each of the disks are aligned substantially linearly to form a stack of the disks, the stack having a longitudinal axis extending through the centers thereof, wherein the periphery of adjacent disks in the stack are separated from each other at different distances in which the closest distance separating the periphery of two adjacent disks is less than a width of a pin bone. Additionally, the apparatus has means for rotating the stack of the disks about the longitudinal axis of the stack.

According to another, embodiment of the present invention, an apparatus dealing with a fillet having an upper side, a lower side, and at least one pin bone therein, has a combination of a plurality of disks, each disk having a center, a periphery circumscribing the center, a diameter, a first side, and an opposed second side, wherein the diameters of each of the disks are substantially the same dimension, means for positioning the disks relative to each other so that the centers of each of the disks are aligned substantially linearly to form a stack of the disks, the stack having a longitudinal axis extending through the centers thereof, wherein the periphery of adjacent disks in the stack are separated from each other at different distances in which the closest distance separating the periphery of two adjacent disks is less than a width of the pin bone of the fillet, and means for producing relative motion between the fillet and the stack of the disks so that the fillet passes adjacent the stack of the disks and so that a portion of the pin bone traverses intermediate the periphery of two adjacent disks in the stack.

According to a further embodiment of the present invention, a pin bone removal apparatus includes a plurality of disks, each disk having a center, a periphery and an opening having a keyway therein, wherein the keyway has a first slot and a second slot connecting to each other, a shaft having a first end, a second end, a plurality of recesses, and a longitudinal axis. The apparatus also has a first cam and a second cam located adjacent the first end of the shaft defining a first nonlinear surface, a third cam and a fourth cam located adjacent the second of the shaft defining a second nonlinear surface. Additionally, the apparatus includes a first arm having, a body and a plurality of spread apart teeth defining a groove between each adjacent pair of teeth, each groove is sized to receive a disk, wherein the first arm is received in one of the recesses of the shaft and engages the disks through the first slots of the keyways of the disks so that the first arm rotates with the shaft and causes the disks to rotate contemporaneously and a second arm having a body and a plurality of spread apart teeth defining a groove between each adjacent pair of teeth, each groove is sized to receive a disk, wherein the second arm is received in one of the recesses of the shaft and engages the disks through the second slots of the keyways of the disks so that the second arm rotates with the shaft and causes the disks to rotate contemporaneously, a first cam follower engaging the first nonlinear surface and the first arm, and a second cam follower engaging the second nonlinear surface and the second arm. In use, the first cam follower rotates with the shaft as the shaft rotates and the first nonlinear surface causes the first cam follower to move along the longitudinal axis of the shaft as to cause the first arm to move along the longitudinal axis of the shaft, and the second cam follower rotates with the shaft as the shaft rotates and the second nonlinear surface causes the second cam follower to move along the longitudinal axis of the shaft to cause the second arm to move along the longitudinal axis of the shaft in an opposite direction of the longitudinal motion of the first arm, so that the disks received by the first arm tilt to a first direction and the disks received by the second arm tilt to an opposite second direction and adjacent disks are cyclical tilted toward each other to form a pinch-point at the peripheries of the disks of a size to grip a pin bone and tilted away from each other so that the peripheries of the adjacent disks are spaced apart.

One way to practice the present invention needs to position the fillet over a stack of a plurality of disks, each disk having a center and a periphery that circumscribes the center, the stack of the disks having a longitudinal axis extending through the centers of the disks, wherein the periphery of adjacent disks in the stack are separated from each other at different distances, in which the closest distance separating the periphery of two adjacent disks is less than the width of the pin bone, and move the stack of the disks and the fillet relative to each other so that the pin bone is disposed intermediate the periphery of two adjacent disks in the stack and removed thereby as the pin bone engages a portion of the periphery of each of the two adjacent disks in which the separation therebetween is less than the width of the pin bone and relative movement exists between the stack of the disks and the pin bone.

BRIEF DESCRIPTION OF THE FIGURES OF THE DRAWINGS

FIG. 6 is side view of a plurality of sequentially aligned pin bone removing stations, each using one stack of the disks shown in FIG. 3.

FIG. 7 is a top view of an alternative embodiment of FIG. 6.

DETAILED DESCRIPTION OF THE INVENTION

Figure 1:
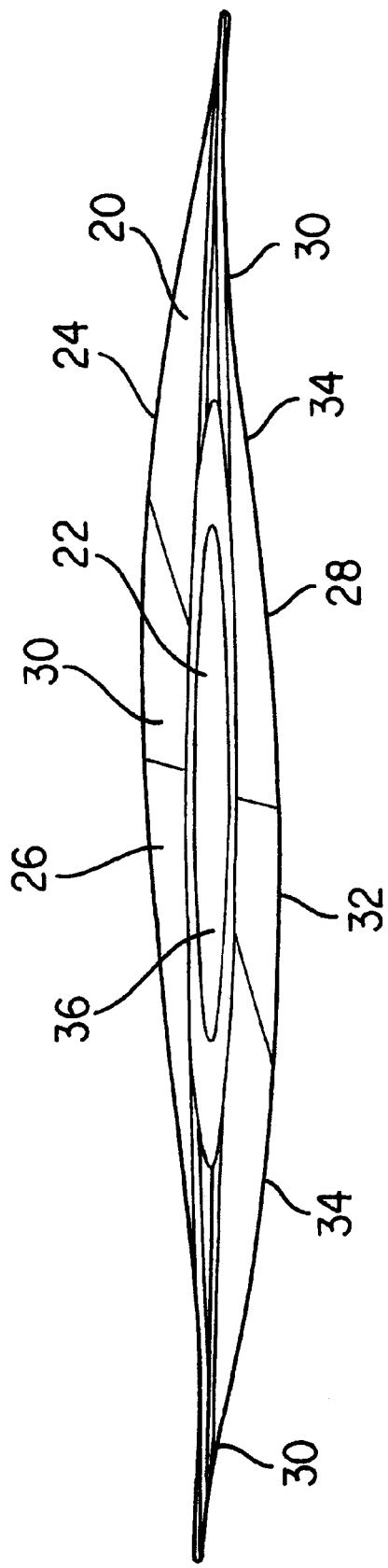
FIG. 1 is a side view of one disk used in conjunction with a first embodiment of the present invention.

The present invention is more particularly described in the following examples that are intended as illustrative only since numerous modifications and variations therein will be apparent to those skilled in the art. As used in the specification and in the claims, "a" can mean one or more, depending upon the context in which it is used. The preferred embodiment is now described with reference to the figures, in which like numbers indicate like parts throughout the figures.

To start the process, the fish is gutted and decapitated. A machine or operator then longitudinally cuts as close to the dorsal spines as is practical, without cutting into the bones, to leave the maximum quantity of meat on the fillet. However, the longitudinal cut also severs the pin bones from the rib bones so that the pin bones remain within the fillet.

Referring generally to FIGS. 1–7, the present invention comprises a method and apparatus 10 for removing the pin bones (not shown) that remain in the fillet F. The preferred embodiment uses a plurality of disks 20 aligned and positioned relative to each other, in which relative movement exists between the fillet F and the disks 20. The disks 20 engage and hold the pin bone and the relative motion therebetween causes the pin bone to be plucked out of the fillet F.

Each disk 20 has a center 22, a periphery 24 circumscribing the center 22, a first side 26, and an opposed second side 28. The disks 20 are preferably formed of spring-tempered sheet metal that is corrosion resistant, but can be formed from any suitable material. The disks 20 are substantially circular in plan view, i.e., a view of the first side 26 or the second side 28 from directly above or below when the disk 20 is horizontally disposed. The disks 20 also have a diameter extending from opposed portions of the periphery 24 through the center 22 of the disk 20. In the presently preferred embodiment, the diameter is between 2 and 10 inches. If the shape of the disk 20 is not circular in plan view (e.g., elliptical), then the diameter would be the "effective" diameter, which is calculated using the area of the cross section. That is, $$D = 4 \times (A/\pi)^{0.5} = 2.26 \times (A)^{0.5},$$

in which D is the effective diameter, A is the cross-sectional area, and π is the constant pi.

The first side 26 and the second side 28 of each of disks 20 can be non-planar or substantially planar. FIG. 1 shows a non-planar disk 20 used in a first embodiment of the present invention. More specifically, the periphery 24 of each disk 20 is nonlinear to form a wavy pattern when the first and second sides 26, 28 are horizontally disposed. In contrast, a compact disk is substantially planar and has a linear periphery. The disks 20 are usually pressed to assume the wave form in their respective peripheries 24.

Still referring to FIG. 1 the periphery 24 of the disk 20 forms a plurality of upwardly positioned sections 30, a plurality of downwardly positioned sections 32, and a plurality of connecting sections 34 in the periphery 24 that connect the upwardly and downwardly positioned sections 30, 32. The upwardly and downwardly positioned sections 30, 32 sequentially alternate around the periphery 24 of the disk 20. The upwardly positioned sections 30 of the periphery 24 are substantially coplanar with each other and the downwardly positioned sections 32 are also substantially coplanar with each other. Accordingly, the connecting sections 34 are disposed at a non-parallel angle relative to the upwardly and downwardly positioned sections 30, 32. Thus, when disposed on a horizontal surface as shown in FIG. 1, the disk 20 rests on three equally-spaced portions of its periphery 24, which are the downwardly positioned sections 32, and three opposite and equally-spaced portions extend upwardly, which are the upwardly positioned sections 30.

As one skilled in the art will appreciate, other patterns of wavy peripheries 24 can be used, such as a sinusoidal pattern, a squared step pattern, and the like.

Figure 2:
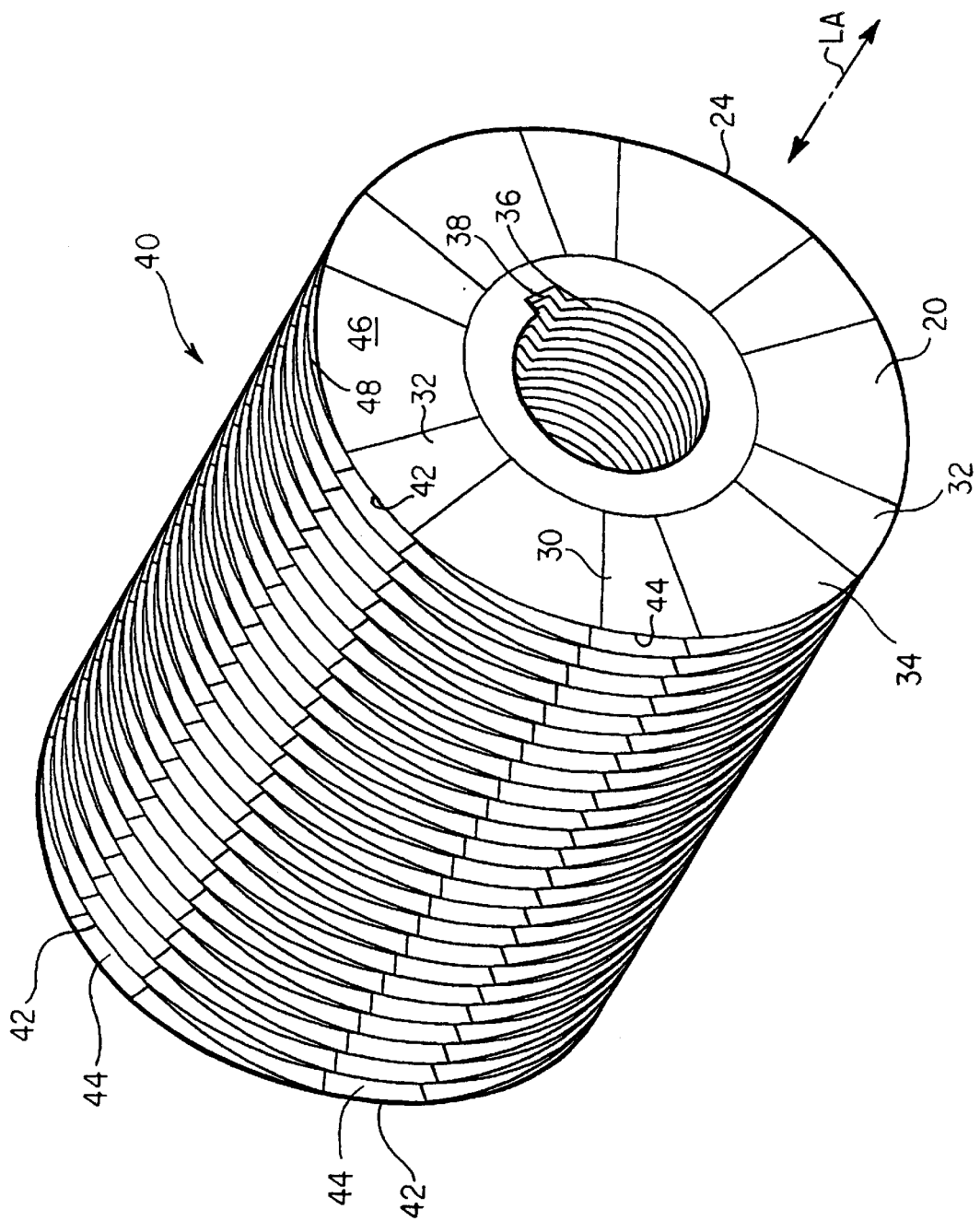
FIG. 2 is a front perspective view of the first embodiment of a stack of the disks, one of which is shown in FIG. 1, in which gaps and pinch-points are formed between the peripheries of adjacent disks in the stack.

Referring now to FIG. 2, the first embodiment of the present invention utilizes a plurality of the non-planar disks 20 to form a stack 40. Specifically, the embodiment encompasses a means for positioning the disks 20 relative to each other to form the stack 40. The centers 22 of each of the disks 20 are aligned substantially linearly with each other so that the stack 40 has a longitudinal axis LA extending through the centers 22 of each of the disks 20. Also, the diameters of each of the disks 20 preferably are the same.

The periphery 24 of adjacent disks 20 in the stack 40 are separated from each other at different distances. The closest distance separating the peripheries 24 of the adjacent disks 20 is less than the width of the pin bones in the fillet F. Preferably, a portions of the respective peripheries 24 of the adjacent disks 20 contact each other, which, obviously, is the closest distance separating the peripheries 24 of two adjacent disks 20 in the stack 40. The contacting portions of the peripheries 24 of the disks 20 are known as "pinch-points" 42. Gaps 44 exist between the radially separated pinch-points 42, in which the respective peripheries 24 of the adjacent disks 20 contact each other at one pinch-point 42, bow away from each other to form a gap 44, and then converge again to form another pinch-point 42. Preferably the separation distance of the peripheries 24 of adjacent disks 20 forming the gaps 44 is, at a minimum, at least twice the width of the pin bones in the fillet F. In the presently preferred embodiment, the widest portion of the radially extending gap 44 is approximately 0.125 inches.

Still referring to FIG. 2, one of the disks 20 in the stack 40 can be considered to be a first disk 46 and an adjacent disk considered to be a second disk 48. Each of the downwardly positioned sections 32 of the periphery 24 of the first disk 46 is in registry with and contacts one respective upwardly positioned section of the periphery 24 of the second disk 48 to form a pinch-point 42. In conjunction, each of the upwardly positioned sections 30 of the first disk 46 is in registry with and is spaced apart from one respective downwardly positioned section of the second disk 48 to form the widest portion of a radially extending gap 44.

Figure 3:
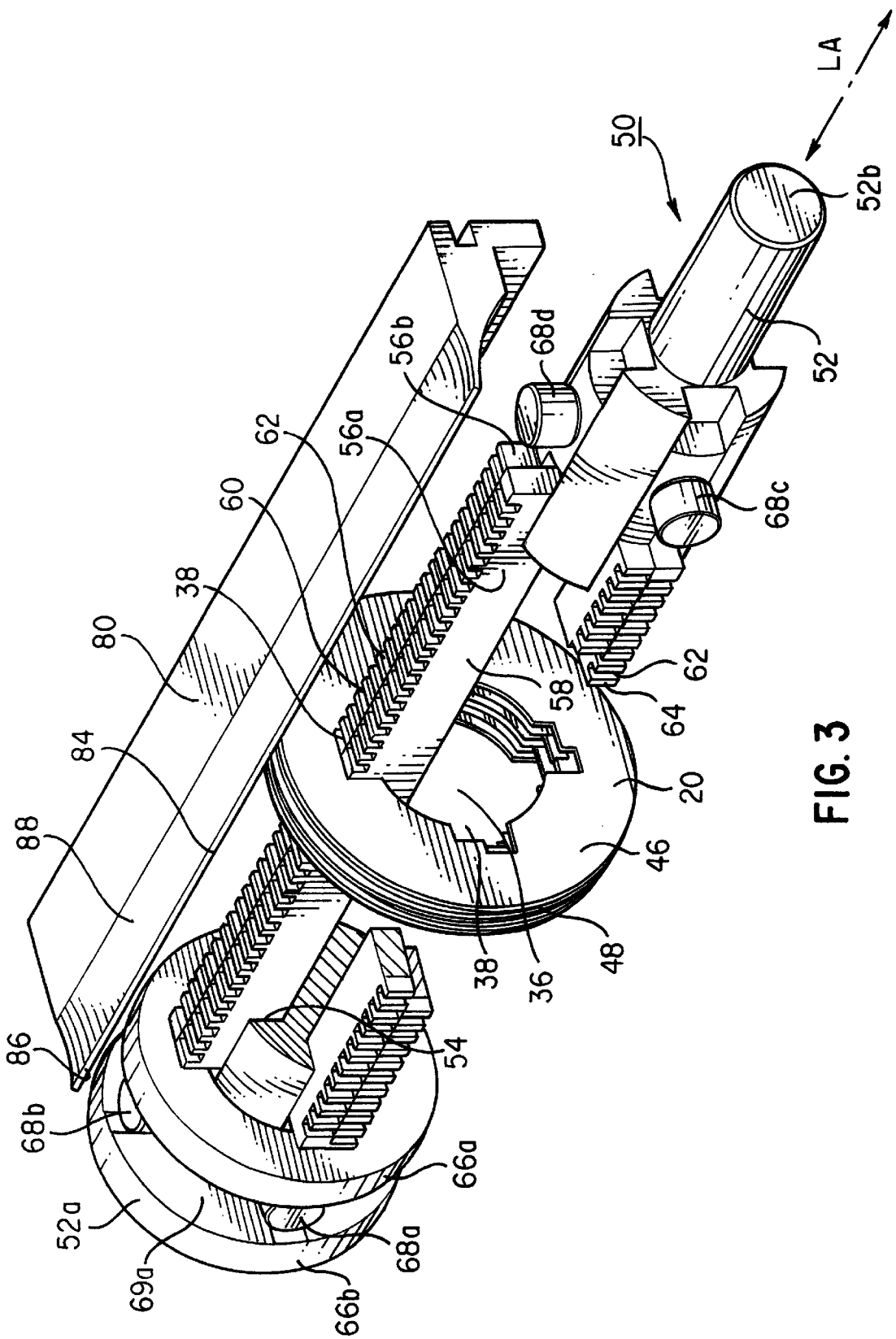
FIG. 3 is a front perspective view of a second embodiment of a stack of the disks, in which disks are substantially planar and the sides of the disks are aligned in a parallel arrangement.

Alternatively, as shown in FIG. 3 for a second embodiment of the present invention, the disks 20 in the stack 40 are each substantially planar. For the planar disks, the sides of the disks 20 can be aligned in a parallel arrangement with the sides of adjacent disks along the longitudinal axis LA. In this arrangement, the sides of the two adjacent disks in the stack 40 are substantially parallel to each other, but can be tilted so that the sides of two adjacent disks in the stack 40 may move toward to each other and form a single pinch-point as described below.

Different structures are preferably used for positioning disks relative to each other to form the stack 40, depending on whether the disks 20 are non-planar or planar. Referring now to FIG. 2 to address the means for positioning the non-planar disks 20 relative to each other to form the stack 40, the center 22 of each disk 20 preferably defines an opening 36 therethrough. The stationary positioning means includes a shaft (not shown) having a circumference of a size to be complementarily received by and disposed through the opening 36 in each disk 20 so that the shaft is disposed along the longitudinal axis LA of the stack 40. More preferably, the opening 36 in each of the disks 20 further defines a keyway 38 and the shaft is splined to be complementarily received in the keyway 38 of the opening 36. Thus, the interface of the keyway 38 and the spline prevent relative rotational movement between the shaft and the disks 20 in the stack 40. FIG. 2 shows the disks 20 aligned to be assembled on the splined shaft forming an alternating pattern of pinch-points 42 and gaps 44. Also, the stationarily positioning means can include an appropriate spacer (not shown) between each disk 20 in the stack 40 to provide the desired axial tension. This assembly of the disks 20 and spacers on a shaft can be of any suitable length. In the presently preferred first embodiment, each stack 40 includes about 132 disks per linear foot, depending on the size of the fish.

The means positioning the planar disks 20 relative to each other to form the stack 40 in the second embodiment has a different structure. As shown in FIG. 3, the positioning means 50 has a shaft 52 having a circumference of a size to be complementarily received by and disposed through the opening 36 in each disk 20 so that the shaft is disposed along the longitudinal axis LA of the stack 40. The shaft 52 has a first end 52a and a second end 52b. Additionally, the shaft 52 defines a plurality of recesses 54, each recess sized to receive a pair of arms 56a and 56b. More than one pair of arms can be received by the shaft 52. For the second embodiment shown in FIG. 3, up to four (4) pairs of arms can be utilized. Obviously, it is not necessary for each recess 54 to receive a pair of arms 56a, 56b, it can just receive a single arm. If more than one arm is utilized these arms are substantially similar to each other in shape.

Figure 4:
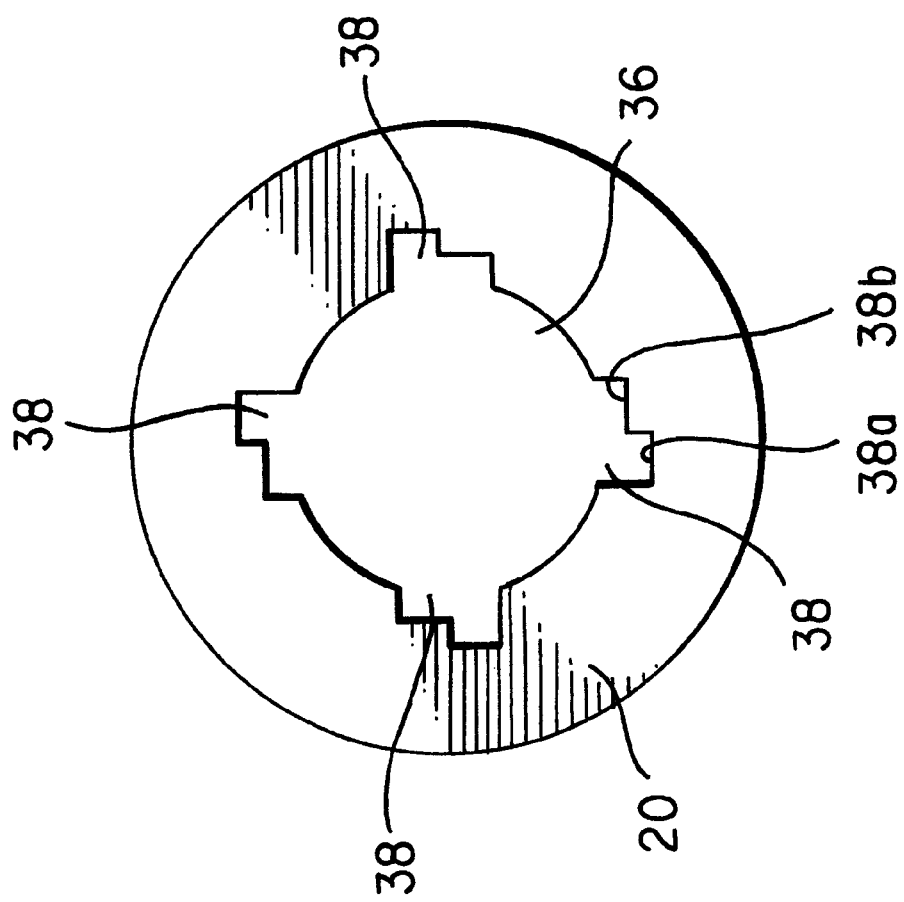
FIG. 4 shows a top view of one disk used in the second embodiment shown in FIG. 3.

The first arm 56a has a body portion 58 and a teeth portion 60. The body portion 58 of the first arm 56a is sized to be complementarily received by and disposed through the recess 54 so that when shaft 52 rotates, the first arm 56a rotates with the shaft 52 as well. The teeth portion 60 is sized to complementarily receive one keyway 38 of the disk 46 therein. As shown in FIG. 4, in this embodiment keyway 38 has a step structure with a first slot 38a and a second slot 38b. The teeth portion of each arm is sized so that when two arms 56a, 56b are both received in the keyway 38, the first arm 56a is received in slot 38a and the second arm 56b is received in slot 38b.

Referring back to FIG. 3, the teeth portion 60 of each arm 56a, 56b contains a plurality of spread apart teeth 64 defining a groove 62 between each adjacent pair of teeth 64. Each groove 62 is sized to receive one of the disks 20 through the interface of the keyways with the teeth portion 60. When a disk, say disk 46, is received within a groove 62, the opposite sides of the disk 46 each contact two teeth 64 that are adjacent to the groove 62. The teeth 64 thus function as spacers to position disks 20 of the stack 40 at proper axial locations with appropriate relative axial separation from each other. Therefore, the interface of the keyways 38 and the teeth portion 60 prevents relative rotational movement as well as the relative lateral movement between the shaft 52 and the disks 20 in the stack 40. Again, the total number of disks 20 in a stack 40 can be easily adjusted according to the need. For the second embodiment of FIG. 3, each stack 40 includes about 86 disks.

Preferably, the first arm 56a and the second arm 56b work in pair to hold disks 20 in a stack 40. As shown in FIG. 4, each disk 20 has four keyways 38. Addressing a single keyway 38, disk 46 is received by a groove 62 of the first arm 56a through the slot 38b of the keyway 38. Disk 48, adjacent to the disk 46, has the positions of the slots 38a, 38b reversed from disk 46 in each of the four keyways 38. The sides of disk 48 are received by a groove 62 of the second arm 56b through the slot 38a. Accordingly, for the single keyway 38 in disks 46 and 48, first arm 56a engages disk 46 with its teeth 64 and does not contact disk 48 because the corresponding slot is higher and second arm 56b engages disk 48 with its teeth and does not contact disk 46. This pattern is repeated along the longitudinal axis LA, thereby providing a pattern of notches by which each arm 56a, 56b engages every other disk 20 of the stack 40. Obviously, the engaging mechanism provided by the shaft 52 and the first arm 56a and the second arm 56b can also be used to position the non-planar disks 20 shown in FIGS. 1 and 2 relative to each other to form a stack 40 with minor modifications.

Two stationary first and second cams 66a, 66b are located near the first end 52a of the shaft 52 with first and second cam followers 68a, 68b. Similarly, two similar stationary third and fourth cams 66c, 66d (not shown) and the third and first cam followers 68c, 68d are located near the second end 52b of the shaft 52. The first cam 66a and the second cam 66b define a nonlinear surface 69a, and the third cam 66c and the fourth cam 66d also define a similar nonlinear surface (not shown). The first and second cam followers 68a, 68b are connected to the shaft 52 and interface with the nonlinear surface 69a. Thus, the first and second cam followers 68a, 68b move back and forth along the longitudinal axis LA when they are rotated by the shaft 52 and contact the nonlinear surface 69a that is stationarily positioned circumscribing the shaft 52. Similarly, the third and fourth cam followers 68c, 68d interface with the nonlinear surface formed by the third cam 66c and the fourth cam 66d and also moves along the longitudinal axis LA when they are rotated by the shaft 52. Each cam follower also engages one arm; for instance, the cam follower 68b engages with the arm 56a while the cam follower 68d engages the arm 56b. Because the cam followers 68b and 68d are located at the opposite ends of the shaft 52, they move in opposite directions. When the shaft 52 rotates, therefore, the second cam follower 68b causes the arm 56a to move along the longitudinal axis LA and at the same time, the fourth cam follower 68d causes the arm 56b also to move along the longitudinal axis LA, but in an opposite direction of the axial or longitudinal motion of the arm 56a, so that the disks received by the arm 56a tilt to a first direction, say left, and the disks received by the arm 56b tilt to a second direction opposite the first direction, say right. Therefore, two adjacent disks are tilted and bent relative to each other and form a pinch-point at the peripheries of the disks to grip a pin bone. As the shaft 52 continues to rotate, the relative motion of arms 56a, 56b causes the two adjacent disks to tilt in reverse directions and thus the two disks disengage and separate from each other and the pinch-point no longer exists. Multiple arms can be utilized to form more pinch-points during a complete round of the rotation by the shaft 52. For the embodiment shown in FIGS. 3 and 4, four pairs of arms engage the disks 20. Alternatively, arms can be introduced into different keyways separately.

Figure 5:
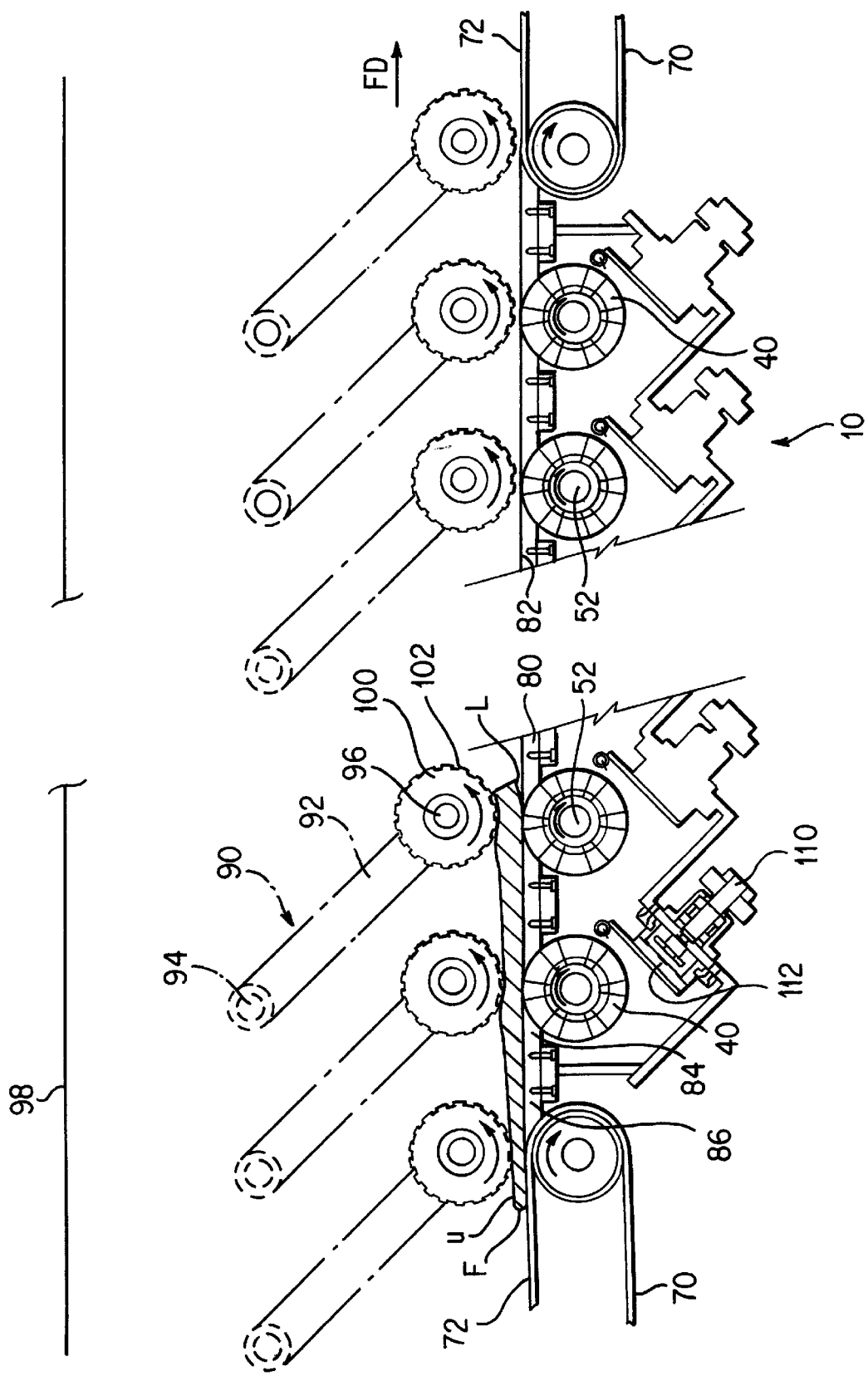
FIG. 5 is side view of a plurality of sequentially aligned pin bone removing stations, each using one stack of the disks shown in FIG. 2.

To remove the pin bones from the fillet F, referring now to FIGS. 5–7, the present invention includes a means for producing relative motion between the fillet F and the stack 40 of the disks 20. As an overview, the fillet F is positioned adjacent the stack 40 and a portion of the pin bone is disposed in one gap 44 between the peripheries 24 of two adjacent disks 20 in the stack 40. As the fillet F and the stack 40 of the disks 20 move relative to each other, the pin bone becomes wedged in a portion of the gap 44 as the bone and a pinch-point 42 move closer together. Additional relative motion causes the wedged pin bone to be plucked from the fillet F as the fillet F and portion of the periphery 24 that detachably holds the pin bone separate from each other. The resulting removal of the pin bone occurs without removing the meat from the fillet F or creating an unattractive appearance.

Referring now to FIG. 5, in which the stack 40 is formed with non-planar disks 20, and to FIG. 6, in which the stack 40 is formed with planar disks 20, the preferred relative motion producing means comprises a means for moving the fillet F in a first direction FD so that the fillet F passes over the stack 40 of the disks 20 and a means for rotating the stack 40 of the disks 20 about its longitudinal axis LA. The rotating means can be a motor (not shown) or the like that produces a rotational output to which the shaft 52 of the stack 40 is coupled.

The moving means in one embodiment of the present invention has two longitudinally extending endless belts 70, in which each of the endless belts 70 has an uppermost top surface 72 that moves in the first direction FD. The endless belts 70 are longitudinally and sequentially aligned in a spaced-apart relationship and the rotating stack 40 of disks 20 is disposed between the two endless belts 70 so that the longitudinal axis LA of the stack 40 is oriented substantially perpendicular to the first direction FD. Preferably, when the fillet F is disposed over the stack 40, the portion of the peripheries 24 of the disks 20 contacting the fillet F is also moving in the first direction FD.

Now referring to FIG. 5, the stack 40 is located between an in-feed table 80 and an out-feed table 82. The in-feed and out-feed tables 80, 82 can take different forms and may be integral. One such table is partly shown in FIG. 6. Referring to both FIGS. 5 and 6, the top surfaces 88 of the respective tables 80, 82 are disposed slightly below the top portion of the peripheries 24 of the disks 20, thus allowing the lower side L of the fillet F to contact a portion of the peripheries 24 of disks 20 in the rotating stack 40. The edges 84 of the in-feed and out-feed tables 80, 82 are preferably contoured to be closely positioned adjacent the peripheries 24 of the disks 20. The top surface 88 and contoured surface of the out-feed table 82 form a corner edge 86.

The present invention preferably further comprises a means for extending the pin bones out of the fillet F. The extending means comprises a floating feed roller 90 having a segment 92 and a wheel 90 mounted to the segment 92. The segment 92 has a first end 94 and an opposed second end 96. The first end 94 of the segment 92 is pivotally connected to a frame 98 or other type of support and is disposed above the second end 96 of the segment 92.

A wheel 100 is rotatably connected to the second end 96 of the segment 92 and has an outer perimeter 102 adapted to roll over the upper side U of the fillet F as it moves in the first direction FD. One wheel 100 is positioned over each rotating stack 40, as shown in both FIGS. 5 and 6. Thus, the wheel 100 contacts the fillet F on its upper side U and the peripheries 24 of the disks 20 in the stack 40 simultaneously contact the lower side L of the fillet F. The wheel 100 applies a light pressure onto the upper side U, which causes pin bones to extend from the lower side L and protrude downwardly slightly from the fillet F. The downwardly exerted force from the wheel 100 is approximately 1 to 4 pounds, depending on the size of the fish.

The portion of the pin bone protruding from the lower side L of the fillet F extends into the gaps 44 of the adjacent disks 20 of the rotating stack 40. The protruding end of the pin bone is blocked from being deflected to ti position out of the way of the approaching pinch-point 42 by the corner edge 86 of the out-feed table 82. That is, a portion of the pin bone is sandwiched between the corner edge 86 of the out-feed table 82 and the pinch-point 42 between the two disks 20. The rotational motion of the stack 40 causes the extending portion of the pin bone to be gripped as the separation between the peripheries 24 of two adjacent disks 20 decreases. The corner edge 86 of the out-feed table 82 supports the fillet F and prevents it from being carried around the rotating shaft with the pin bone. The gripped pin bone, therefore, is removed from the fillet F because the pulling force of the rotating stack 40 exceeds the resistance force holding the pin bone in the fillet F.

The removed pin bone remains between the peripheries 24 of two disks 20 as the stack 40 rotates. The removed pin bones and some residue flesh may stay and accumulate in the gaps, which may reduce the available space in the gaps to catch unremoved pin bone and thus decrease the efficiency of the operation, whether the disks are non-planar or planar. Even if in the second embodiment discussed above, the planar disks do not form "permanent" pinch-points and removed pin bone may just fall away when the disks move away from each other, residue flesh may still cloak the surfaces of the disks. To deal with the removed pin bone and residue flesh, the present invention further has a means for removing pin bones extracted from the fillet F and held between the peripheries 24 of two adjacent disks 20 in the stack 40. The preferred embodiment is a high-pressure water blast from a nozzle 112 of an oscillating washer assembly 110 directed at the peripheries 24 of the disks 20 in the stack 40. The water pushes the pin bone away from the pinch-point 42 toward a wider portion of the gap 44. Thus, the oscillating water jet moves the pin bone so that it is no longer tightly gripped between the disks 20 and the pin bone then separates from the stack 40 as a result of the force of the water striking the bone, gravity, or centrifugal force. The high-pressure water blast also removes any other residual material that transferred from the lower side L of the fillet F onto the peripheries 24 of the disks 20 in the stack 40. Other embodiments of the removing means may be used, such as a vacuum (not shown) or physical means that extends between the disks to facilitate removal, and the like.

The disclosed arrangement of a rotating stack 40 of the disks 20, infeed and out-feed tables 80, 82, floating feed roller 90, and oscillating washer assembly 110 is repeated a successive number of times, which subjects the fillet F to the pulling process an adequate number of times to insure that all the bones in the fillet F are removed. Some of the sequentially aligned rotating stacks 40 of disks 20 are preferably laterally offset from each other, preventing the possibility that a pin bone always contacts the edge of a periphery 24 of a disk 20 and is never disposed in a gap 44 between two disks 20. Furthermore, as shown in FIG. 7, stacks with different sized disks can be sequentially aligned to remove pin bone away from different parts of the fish fillet F. Also, in the preferred embodiment, many fillets are consecutively fed through the arrangement of components.

Many variations can be made within the spirit of the present invention. For example, the process could be performed without using the out-feed table, but problems may occur with the pin bones deflected out of the path of the pinch-point 42 and not be gripped. Alternatively, it is possible to maintain the stack 40 stationary and move the fillet F over the stack 40 or rotate the stack 40 in the opposite direction that the fillet F moves over the stack 40.

Still another alternative is to use the stack 40 independent of a processing system. In this embodiment, it is preferred to use non-planar disks to form the stack 40. In use, the stack 40 could be connected to a movable rotating means that generates a rotational output such as a hand-held variable speed electric drill, in which the operator manually moves the rotating stack 40 along the length of the fillet F. The advantage of this alternative is lower cost, which allows individual fishermen to enjoy the advantages of the present invention.

Although the present invention has been described with reference to specific details of certain embodiments thereof, it is not intended that such details should be regarded as limitations upon the scope of the invention except as and to the extent that they are included in the accompanying claims.

What is claimed is:

1. A pin bone removal apparatus comprising:
   a. a plurality of disks, each disk having a center, a periphery circumscribing the center, a diameter, a first side, and an opposed second side, wherein the diameters of each of the disks are substantially the same dimension;
   b. means for positioning the disks relative to each other so that the centers of each of the disks are aligned substantially linearly to form a stack of the disks, the stack having a longitudinal axis extending through the centers thereof, wherein the periphery of adjacent disks in the stack are separated from each other at different distances in which the closest distance separating the periphery of two adjacent disks is less than a width of a pin bone; and
   c. means for rotating the stack of the disks about the longitudinal axis of the stack.

2. The pin bone removal apparatus of claim 1, wherein the disks are substantially circular in plan view and the first side and the second side of each of disks are non-planar.

3. The pin bone removal apparatus of claim 1, wherein the disks are substantially circular in plan view and the first side and the second side of each of disks are planar.

4. The pin bone removal apparatus of claim 1, wherein the closest distance separating the periphery of two adjacent disks in the stack is a portion of the periphery of the adjacent disks contacting each other.

5. The pin bone removal apparatus of claim 1, wherein at least a portion of the periphery of each of the adjacent disks in the stack are spaced apart from each other a distance at least twice the width of the pin bone.

6. The pin bone removal apparatus of claim 1, wherein the center of each disk defines an opening therethrough, and
   wherein the positioning means comprises a shaft having a circumference of a size to be complementarily received by and disposed through the opening in each disk so that the shaft is disposed along the longitudinal axis of the stack.

7. The pin bone removal apparatus of claim 6, wherein the opening in each of the disks further defines at least one keyway and the shaft is splined to be complementarily received in the keyway of the opening so that the interface of the keyway and the spline prevents relative rotational movement between the shaft and the disks in the stack.

8. The pin bone removal apparatus of claim 1, wherein the center of each disk defines an opening therethrough, and
   wherein the positioning means comprises:
   a. a shaft having a first end, a second end, at least one recess and a circumference of a size to be complementarily received by and disposed through the opening in each disk so that the shaft is disposed along the longitudinal axis of the stack; and
   b. a first arm and a second arm, each arm having a body and a plurality of spaced apart teeth defining a groove between each adjacent pair of teeth,
   wherein the body of each arm is complementarily received in the recess of the shaft so that each arm rotates with the shaft as the shaft rotates, wherein each groove is sized to receive a portion of the periphery of one of the disks, and wherein the teeth are sized to separate the adjacent disks along the longitudinal axis of the stack of the disks.

9. The pin bone removal apparatus of claim 8, wherein the opening in each of the disks further defines at least one keyway having a first slot and a second slot and wherein the teeth of the first arm and the second arm are sized to be complementarily received in one of the first slot and the second slot of the keyway of the opening so that the engagement of the keyway and the teeth prevents relative rotational movement between the shaft and the disks in the stack and causes the disks to rotate with the shaft as the shaft rotates.

10. The pin bone removal apparatus of claim 8, wherein the positioning means further comprises:
    a. a first cam and a second cam located adjacent the first end of the shaft defining a first nonlinear surface;
    b. a third cam and a fourth cam located adjacent the second end of the shaft defining a second nonlinear surface;
    c. a first cam follower in contact with the first nonlinear surface, wherein the first cam follower is received in the shaft recess to engage the first arm received therein; and
    d. a second cam follower in contact with the second nonlinear surface, wherein the second cam follower is received in the shaft recess to engage the second arm received therein,
    wherein the first cam follower rotates with the shaft as the shaft rotates and the first nonlinear surface causes the first cam follower to move along the longitudinal axis of the shaft as to cause the first arm to move along the longitudinal axis of the shaft, and the second cam follower rotates with the shaft as the shaft rotates and the second nonlinear surface causes the second cam follower to move along the longitudinal axis of the shaft to cause the second arm to move along the longitudinal axis of the shaft in an opposite direction of the longitudinal motion of the first arm, so that the disks received by the first arm tilt to a first direction and the disks received by the second arm tilt to an opposite second direction and adjacent disks are cyclical tilted toward each other to form a pinch-point at the peripheries of the disks of a size to grip a pin bone and tilted away from each other so that the peripheries of the adjacent disks are spaced apart.

11. The pin bone removal apparatus of claim 1, further comprising means for removing pin bones disposed between the periphery of two adjacent disks.

12. The pin bone removal apparatus of claim 1, further comprising means for extending the pin bone out of a fillet having an upper side and a lower side.

13. The pin bone removal apparatus of claim 12, wherein the extending means comprises a floating feed roller, the feed roller comprising:
    a. a frame;
    b. a segment having a first end pivotally connected to the frame and an opposed second end wherein the first end of the segment is disposed above the second end; and
    c. a wheel rotatably connected to the second end of the segment and having an outer perimeter adapted to roll over the upper side of the fillet, wherein contact between the wheel and the fillet causes pin bones to extend from the lower side thereof.

14. The pin bone removal apparatus of claim 1, wherein the periphery of each disk forms a wavy pattern when the first and second sides thereof are horizontally disposed.

15. The pin bone removal apparatus of claim 14, wherein the periphery of each disk forms a plurality of upwardly positioned sections, a plurality of downwardly positioned sections, and a plurality of connecting sections that connect the upwardly and downwardly positioned sections which sequentially alternate around the periphery of the disk, wherein the upwardly positioned sections are substantially coplanar with each other, the downwardly positioned sections are substantially coplanar with each other, and the connecting sections are disposed at a non-parallel angle relative to the upwardly and downwardly positioned sections.

16. The pin bone removal apparatus of claim 15, wherein the stack of the disks includes a first disk and an adjacent second disk, and wherein each of the downwardly positioned sections of the periphery of the first disk are in registry with and contact one respective upwardly positioned section of the periphery of the second disk and the each of the upwardly positioned sections of the first disk are in registry with and are spaced apart from one respective downwardly positioned section of the second disk.

17. In combination:
a. a fillet having an upper side, a lower side, and at least one pin bone therein;
b. a plurality of disks, each disk having a center, a periphery circumscribing the center, a diameter, a first side, and an opposed second side, wherein the diameters of each of the disks are substantially the same dimension;
c. means for positioning the disks relative to each other so that the centers of each of the disks are aligned substantially linearly to form a stack of the disks, the stack having a longitudinal axis extending through the centers thereof, wherein the periphery of adjacent disks in the stack are separated from each other at different distances in which the closest distance separating the periphery of two adjacent disks is less than a width of the pin bone of the fillet; and
d. means for producing relative motion between the fillet and the stack of the disks so that the fillet passes adjacent the stack of the disks and so that a portion of the pin bone traverses intermediate the periphery of two adjacent disks in the stack.

18. The combination of claim 17, wherein the relative motion producing means comprises:
a. means for moving the fillet in a first direction so that the fillet passes over the stack of the disks; and
b. means for rotating the stack of the disks about the longitudinal axis of the stack so that, when the fillet is disposed over the stack, the portion of the periphery of the disks adjacent the fillet is moving in the first direction.

19. The combination of claim 18, wherein the moving means comprises two longitudinally extending endless belts, wherein each of the endless belts has an uppermost top surface that moves in the first direction, wherein the endless belts are longitudinally and sequentially aligned in a spaced apart relationship, and wherein the rotating stack of disks is disposed between the two endless belts in which the longitudinal axis of the stack is oriented substantially perpendicular to the first direction.

20. The combination of claim 17, further comprising a floating feed roller, the feed roller comprising:
a. a frame,
b. a segment having a first end pivotally connected to the flame and an opposed second end, wherein the first end of the segment is disposed above the second end; and c. a wheel, disposed over the stack of the disks, rotatably connected to the second end of the segment and having an outer perimeter adapted to roll over the upper side of the fillet as the fillet moves in the first direction, wherein contact between the wheel and the fillet causes pin bones to extend from the lower side thereof.

21. The combination of claim 17, wherein the periphery of each disk forms a wavy pattern when the first and second sides thereof are horizontally disposed.

22. The combination of claim 17, wherein the periphery of each disk is substantially circular.

23. A pin bone removal apparatus, comprising:
a. a plurality of disks, each disk having a center, a periphery and an opening having a keyway therein, wherein the keyway has a first slot and a second slot connecting to each other;
b. a shaft having a first end, a second end, a plurality of recesses, and a longitudinal axis;
c. a first cam and a second cam located adjacent the first end of the shaft defining a first nonlinear surface;
d. a third cam and a fourth cam located adjacent the second of the shaft defining a second nonlinear surface;
e. a first arm having a body and a plurality of spaced apart teeth defining a groove between each adjacent pair of teeth, each groove is sized to receive a disk, wherein the first arm is received in one of the recesses of the shaft and engages the disks through the first slots of the keyways of the disks so that the first arm rotates with the shaft and causes the disks to rotate contemporaneously;
f. a second arm having a body and a plurality of spaced apart teeth defining a groove between each adjacent pair of teeth, each groove is sized to receive a disk, wherein the second arm is received in one of the recesses of the shaft and engages the disks through the second slots of the keyways of the disks so that the second arm rotates with the shaft and causes the disks to rotate contemporaneously;
g. a first cam follower engaging the first nonlinear surface and the first arm; and
h. a second cam follower engaging the second nonlinear surface and the second arm, wherein the first cam follower rotates with the shaft as the shaft rotates and the first nonlinear surface causes the first cam follower to move along the longitudinal axis of the shaft as to cause the first arm to move along the longitudinal axis of the shaft, and the second cam follower rotates with the shaft as the shaft rotates and the second nonlinear surface causes the second cam follower to move along the longitudinal axis of the shaft to cause the second arm to move along the longitudinal axis of the shaft in an opposite direction of the longitudinal motion of the first arm, so that the disks received by the first arm tilt to a first direction and the disks received by the second arm tilt to an opposite second direction and adjacent disks are cyclical tilted toward each other to form a pinch-point at the peripheries of the disks of a size to grip a pin bone and tilted away from each other so that the peripheries of the adjacent disks are spaced apart.

24. A method of removing a pin bone from a fillet, the pin bone having a width, comprising the steps of:
a. positioning the fillet over a stack of a plurality of disks, each disk having a center and a periphery that circumscribes the center, the stack of the disks having a longitudinal axis extending through the centers of the disks, wherein the periphery of adjacent disks in the stack are separated from each other at different distances, in which the closest distance separating the periphery of two adjacent disks is less than the width of the pin bone; and b. moving the stack of the disks and the fillet relative to each other so that the pin bone is disposed intermediate the periphery of two adjacent disks in the stack and removed thereby as the pin bone engages a portion of the periphery of each of the two adjacent disks in which the separation therebetween is less than the width of the pin bone and relative movement exists between the stack of the disks and the pin bone.

25. The method of claim 24, wherein the moving step comprises:
   a. transferring the fillet in a first direction so that the fillet passes over the stack of the disks; and
   b. rotating the stack of the disks about the longitudinal axis of the stack.

26. The method of claim 25, wherein, when the fillet is disposed over the stack of the disks, a portion of the periphery of the disks adjacent the fillet is moving in the first direction.

27. The method of claim 26, further comprising the step of extending the pin bone out of the fillet when the fillet passes over the stack of the disks.

* * * * *